(12) United States Patent
Homma et al.

(10) Patent No.: US 8,663,482 B2
(45) Date of Patent: Mar. 4, 2014

(54) SOLID-LIQUID SEPARATING DEVICE, FILTERING APPARATUS, AND SOLID-LIQUID SEPARATING METHOD

(75) Inventors: Tomoki Homma, Saitama (JP); Takashi Higami, Tokyo (JP); Shuji Iwasaki, Kawaguchi (JP); Toshiaki Tachikawa, Tokyo (JP); Nobutaka Sakurai, Matsudo (JP)

(73) Assignee: Tsukishima Kikai Co., Ltd., Tokyo (JP)

( * ) Notice: Subject to any disclaimer, the term of this patent is extended or adjusted under 35 U.S.C. 154(b) by 651 days.

(21) Appl. No.: 12/933,009

(22) PCT Filed: Mar. 9, 2009

(86) PCT No.: PCT/JP2009/054449
§ 371 (c)(1),
(2), (4) Date: Sep. 16, 2010

(87) PCT Pub. No.: WO2009/119295
PCT Pub. Date: Oct. 1, 2009

(65) Prior Publication Data
US 2011/0036769 A1    Feb. 17, 2011

(30) Foreign Application Priority Data

Mar. 25, 2008 (JP) ................ P2008-078286
Oct. 15, 2008 (JP) ................ P2008-266484
Oct. 29, 2008 (JP) ................ P2008-278408

(51) Int. Cl.
*B01D 33/04* (2006.01)
(52) U.S. Cl.
USPC .............. 210/783; 210/386; 100/37; 100/121

(58) Field of Classification Search
USPC ............ 210/386, 400, 401, 783; 100/37, 110, 100/116, 121
See application file for complete search history.

(56) References Cited

U.S. PATENT DOCUMENTS 3,860,944 A * 1/1975 Huber et al. .................. 396/622
5,543,044 A * 8/1996 Louden et al. ................ 210/386

(Continued)

FOREIGN PATENT DOCUMENTS

JP    54106965    8/1979
JP    5415783    12/1979

(Continued)

OTHER PUBLICATIONS

English Translation of International Search Report Dated Jun. 9, 2009, PCT/JP2009/054449.

(Continued)

*Primary Examiner* — Fred Prince
(74) *Attorney, Agent, or Firm* — Hoffmann & Baron, LLP

(57) ABSTRACT

A solid-liquid separating apparatus is provided with: a separating roll which has a substantially cylindrical shape with a plurality of through holes, which penetrate between an inner surface and an outer surface in radial direction thereof, and is rotatable in circumferential direction thereof; and a pair of separating filter cloths which is endless belts capable of traveling in a rotation direction of the separating roll and are wound around the outer circumference of the separating roll so as to overlap each other, wherein a material supplied between the pair of filter cloths is squeezed by being rolled together with the pair of filter cloths therebetween on the outer circumference of the separating roll, and the material is dehydrated by ventilating via each through hole.

3 Claims, 9 Drawing Sheets

(56) References Cited

U.S. PATENT DOCUMENTS 5,700,356 A * 12/1997 Lefkowitz ................. 162/358.1
6,942,786 B1 * 9/2005 Fosseng ........................ 210/97

FOREIGN PATENT DOCUMENTS

| JP | 54157383 | 12/1979 |
| JP | 56124410 | 9/1981 |
| JP | 56147996 | 11/1981 |
| JP | UM-A-60-089991 | 6/1982 |
| JP | 57135016 | 8/1982 |
| JP | 57184720 | 11/1982 |
| JP | 58181397 | 12/1983 |
| JP | 58184275 | 12/1983 |
| JP | 6089990 | 6/1985 |
| JP | 6089991 | 6/1985 |
| JP | UM-A-60-089990 | 6/1985 |
| JP | 6003919 | 11/1985 |
| JP | 60039191 | 11/1985 |
| JP | 62001421 | 1/1987 |
| JP | 63134013 | 6/1988 |
| JP | 01122698 | 5/1989 |
| JP | 3044245 | 9/1991 |
| JP | 0655012 | 3/1994 |
| JP | 06297366 | 11/2006 |
| JP | 2006297366 | 11/2006 |
| JP | 2007083117 | 4/2007 |
| JP | 07083117 | 4/2008 |
| TW | 553758 | 7/2004 |

OTHER PUBLICATIONS

Taiwan Office Action Dated Nov. 18, 2011.

* cited by examiner

SOLID-LIQUID SEPARATING DEVICE, FILTERING APPARATUS, AND SOLID-LIQUID SEPARATING METHOD

TECHNICAL FIELD

The present invention relates to a solid-liquid separating device used particularly as a secondary dehydration mechanism of a horizontal vacuum filtering apparatus, a drum type vacuum filtering apparatus, and a filtering apparatus like a beltpress dehydrator of only a machine squeezing dehydration mechanism which filter a material supplied onto a filter cloth which is wound around a plurality of rolls and travels therealong, a filtering apparatus using the solid-liquid separating device, and a solid-liquid separating method.

Priority is claimed on Japanese Patent Application No. 2008-078286, Japanese Patent Application No. 2008-266484, and Japanese Patent Application No. 2008-278408, the contents of which are incorporated herein by reference.

DESCRIPTION OF RELATED ART

Among such filtering apparatuses, the horizontal vacuum filtering apparatus generally supplies a material onto a filter cloth which travels on a vacuum tray continuously or intermittently, and carries out vacuum suction on the vacuum tray via this filter cloth to filter the material. Additionally, the drum type vacuum filtering apparatus generally carries out vacuum suction by a vacuum chamber via a filter cloth immersed in the slurry within a liquid bath. However, a larger differential pressure than the atmospheric pressure cannot be acted under normal circumstances. Consequently, it is difficult for the liquid content in a filtered cake to achieve a target value, and a secondary dehydrator, such as a centrifuge or a filter press, should often be required to additionally prepare at a subsequent stage of this filtering apparatus.

For example, a configuration in which a solid-liquid separating device including a sealing device having a frame-like or annular sealant which can move forward or backward toward a filtered cake, and a pressing device which presses the cake by a pressing plate or a pressure fluid (air or the like) inside an aperture surface of this sealant is provided at a subsequent stage of the horizontal vacuum filtering apparatus filtered by only on such a vacuum tray is suggested in Patent Document 1 and Patent Document 2. In the horizontal filtering apparatus provided with the solid-liquid separating device, the sealant is stuck on the cake which has moved by the traveling of the filter cloth, and the cake is pressed and dehydrated by the pressing device inside the apparatus.

[Patent Document 1] Japanese Unexamined Patent Application, First Publication No. 2006-297366
[Patent Document 2] Japanese Unexamined Patent Application, First Publication No. 2007-83117

DISCLOSURE OF THE INVENTION

Problem to be Solved by the Invention

However, even in the horizontal vacuum filtering apparatus provided with such a solid-liquid separating device, it may be difficult to achieve liquid content in the cake to sufficient target value by only the expression pressure or linear pressure applied in a direction perpendicular to the filter cloth by the pressing plate or pressing roll, depending on the composition or properties of a material. Additionally, as described above, the solid-liquid separating device, which advances sealant to the cake which has moved to the subsequent stage by the traveling of the filter cloth and brings the sealant into close contact with the cake thereby pressing the cake, cannot be applied without any change when the filter cloth travels continuously.

The present invention was made under such a background, and aims at providing a solid-liquid separating device capable of being used particularly as a secondary dehydration mechanism of such a filtering apparatus, thereby sufficiently reducing the liquid content of material to be dehydrated (cake) and performing continuous solid liquid separation, a filtering apparatus including this solid-liquid separating device as a secondary dehydration mechanism, and a solid-liquid separating method.

Means for Solving the Problem

In order to solve the above problems and achieve the above object, a solid-liquid separating device of the present invention includes: a separating roll which has a substantially cylindrical shape with a plurality of through holes, which penetrate between an inner surface and an outer surface in radial direction thereof, and is rotatable in circumferential direction thereof; and a pair of separating filter cloths which is endless belts capable of traveling in a rotation direction of the separating roll and are wound around the outer circumference of the separating roll so as to overlap each other, wherein a material supplied between the pair of filter cloths is squeezed by being rolled together with the pair of filter cloths therebetween on the outer circumference of the separating roll, and the material is dehydrated by ventilating via each through hole.

Additionally, a solid-liquid separating method of the present invention includes steps of: traveling a pair of separating filter cloths which is endless belts wound around a separating roll having a substantially cylindrical shape with a plurality of through holes, which penetrate between an inner surface and an outer surface in radial direction thereof, and is rotatable in a circumferential direction thereof so as to overlap each other along a rotational direction of the separating roll; squeezing a material, which has been supplied between the pair of separating filter cloths, between the pair of separating filter cloths on the outer circumference of the separating roll; and dehydrating by ventilating via each through hole.

As such, in the solid-liquid separating device and the solid-liquid separating method of the above configuration, a material is supplied to and sandwiched between the pair of separating filter cloths, and is wound around and pressed against an outer circumference of the separating roll which rotates in a circumferential direction, whereby the material is squeezed. Consequently, the material which has been supplied can be reliably dehydrated even when the rotation of the separating roll or the traveling of the separating filter cloth along the rotational direction is not only intermittent but also continuous.

In this way, when the material is pressed against the outer circumference of the rotating separating roll, the material not only receives a pressing force in the radial direction of the separating roll, but also receives a shearing force in the circumferential direction by the difference of the traveling speed between an inner separating filter cloth on the side of the separating roll and an opposite outer separating filter cloth, i.e., the difference of the circumferential speed, with the material therebetween. Therefore, the material is squeezed efficiently. Additionally, since the material squeezed in this way is ventilated in the radial direction of the separating roll, and a liquid component thereof is separated via one separating filter cloth, it is possible to promote effective removal of a liquid component even from a material of which a sufficient decline in liquid content was difficult only by the expression pressure or linear pressure and pressing in a direction perpendicular to the filter cloth.

Here, in order to ventilate the material, which is sandwiched between the pair of separating filter cloths wound around the outer circumference of the separating roll in this way, in the radial direction of the separating roll, thereby dehydrating the material, for example, it is desirable that the material is ventilated such that air or the like for ventilation is supplied to the inside of the separating roll and blown off toward the radial outer side.

In this case, a plurality of ventilation chambers may be formed inside the separating roll so as to be isolated from each other at almost equal intervals in the circumferential direction.

This makes it possible to perform ventilation within an area in which the pair of separating filter cloths which sandwiches material therebetween is wound around the separating roll. As a result, ventilation can be prevented from being performed even in a portion which is not involved in dehydration of portions other than this area.

Particularly, in such a case, ventilation is performed by only via each of the through holes provided in a predetermined area in the circumferential direction within an area of the separating roll in which the pair of separating filter cloths is wound.

This makes it possible to prevent increasingly more air than the required amount air supplied for ventilation, thereby promoting efficient dehydration.

When the material is ventilated from a radial inner circumference of the separating roll toward a radial outer circumference thereof, a separated liquid component is discharged via the separating filter cloth wound around the outer side of the separating roll of the pair of separating filter cloths. However, since the roll is cylindrical, the discharged liquid component is transmitted to the outside of the outer separating filter cloth and permeates again into the material which has been dehydrated through this separating filter cloth, there is a probability that a decline in liquid content may be obstructed.

In such a case, the solid-liquid separating device may further include a liquid component removing portion which is disposed at an outer circumference of an outside separating filter cloth of the pair of separating filter cloths wound around the outer circumference of the separating roll and removes a liquid component, which has been separated from the material, from the outside separating filter cloth, and ventilating may be made outward via the through holes from the radial inside of the separating roll.

This makes it possible to recover the liquid content dehydrated in this way before the liquid content permeates again into the material, thereby preventing aggravation of the liquid content.

As such liquid component removing portion, one may scrape a liquid component separated from the material on the outer surface of the outside separating filter cloth.

This makes it possible to prevent the liquid component from permeating again into the material, thereby recovering the liquid component separated from the material.

Additionally, as the liquid component removing portion or in combination with this, another may suck up a liquid component separated from the material.

This makes it possible to recover a liquid component separated from the material.

The filtering apparatus of the present invention is a filtering apparatus which filters a material. The filtering apparatus includes: a plurality of rolls; a filter cloth would around the plurality of rolls and traveling therealong; a supply device which supplies the material onto the filter cloth; a filtering device arranged ahead of the supply device in a traveling direction of the filter cloth; and the solid-liquid separating device disposed ahead of the filtering device in the traveling direction of the filter cloth. A roll of the plurality of rolls which is located ahead of the filtering device in the traveling direction of the filter cloth is the separating roll of the solid-liquid separating device, and the filter cloth is any one of the pair of separating filter cloths of the solid-liquid separating device.

Accordingly, in such a filtering apparatus, such as the horizontal vacuum filtering apparatus described above, the roll of the filtering apparatus which is located ahead of the filtering device in the traveling direction is used as the separating roll of the solid-liquid separating device, and the filter cloth of the filtering apparatus is any one of the pair of separating filter cloths of the solid-liquid separating device. Thus, the material on the filter cloth filtered by the filtering device is moved toward the front side of the filtering device in the traveling direction of the filter cloth, i.e., to the subsequent stage of the filtering device continuously, is sandwiched between the one separating filter cloth and the other separating filter cloth, and is wound around the separating roll, whereby the material is squeezed and ventilated, and is effectively dehydrated as described above.

Consequently, even if a secondary dehydrator, such as a centrifuge and a filter press, is not required to prepare at the subsequent stage of this filtering apparatus other than this filtering apparatus, the material having small liquid content can be obtained, which is efficient. As a result, it is possible to ease the burden of a drying device used when the material dehydrated in this way is dried. Moreover, since the filter cloth and rolls of the filtering apparatus can be utilized as separating filter cloth and separating rolls of a solid-liquid separating device, this is also economical. Also, since the solid-liquid separating device can also deal with continuous supply of the material, the liquid content of the material can be reliably reduced even in a horizontal vacuum filtering apparatus, a drum type vacuum filtering apparatus, and a filtering apparatus like a beltpress dehydrator, in which a filter cloth travels continuously.

a squeezing belt wound around an outer circumference of an outside separating filter cloth of the pair of separating filter cloths wound around the outer circumference of the separating roll, and capable of traveling in a rotational direction of the separating roll along with the pair of separating cloths, and the material may be squeezed by the pair of separating filter cloths and the squeezing belt.

In the solid-liquid separating method of the present invention, a squeezing belt which is wound around an outer circumference of an outside separating filter cloth of the pair of separating filter cloths wound around the outer circumference of the separating roll may travel along the rotational direction of the separating roll together with the pair of separating filter cloths, and the material may be squeezed by the pair of separating filter cloths and the squeezing belt.

Accordingly, in the solid-liquid separating device and the solid-liquid separating method which are configured in this way, a material is supplied to and sandwiched between the pair of separating filter cloths, and is wound around and pressed against an outer circumference of the separating roll which rotates in a circumferential direction while traveling along the rotational direction, and the squeezing belt is similarly wound around and pressed from the outer circumference of the separating roll while traveling along the rotational direction of the separating roll, whereby the material is squeezed. Consequently, the material which has been supplied can be reliably dehydrated even when the rotation of the separating roll or the traveling of the separating filter cloths along the rotational direction is not only intermittent but also continuous.

In this way, when the material is pressed against the outer circumference of the rotating separating roll, the material not only receives a pressing force in the radial direction of the separating roll, but also receives a shearing force in the circumferential direction by the difference of the traveling speed between an inner separating filter cloth on the side of the separating roll and an opposite outer separating filter cloth, i.e., the difference of the circumferential speed, with the material therebetween. Therefore, the material is squeezed efficiently. Also, since the material squeezed in this way is further ventilated in the radial direction of the separating roll, and a liquid component thereof is separated via an outer separating filter cloth, it is possible to promote effective removal of a liquid component even from a material of which a sufficient decline in liquid content was difficult only by the expression pressure or linear pressure and pressing in a direction perpendicular to the filter cloth.

Moreover, the squeezing belt is wound around an outer circumference of the outer separating filter cloth, and thereby the separating filter cloth and the material can be reliably pressed against the separating roll. Thus, for example, even when the pressure of ventilation is increased in order to improve the capability of liquid removal, the expression pressure of the squeezing belt wound around the outer circumference of the outside separating filter cloth of the pair of separating filter cloths wound around the outer circumference of the separating roll is increased the pressure of ventilation gas which is ventilated via the through holes. Accordingly, it is possible to prevent the separating filter cloths from floating, causing dispersion of a pressure fluid (ventilation gas), and a liquid removal effect by ventilation may be impaired instead, and it is possible to prevent the cake from being blown off from both sides of the separating filter cloths in the width direction or from the front or rear thereof in the traveling direction. As a result, it is possible to more reliably improve the liquid removal effect.

In order for the squeezing belt not to obstruct the liquid removal from the material via the separating filter cloths, the squeezing belt may have higher air permeability than the separating filter cloths. Thus, if the squeezing belt has higher air permeability as such, and is able to stand the tension which generates higher expression pressure than the ventilation gas pressure as described above, the squeezing belt may be a filter cloth; a metal belt made of metal mesh, a chain, or the like; a resin belt made of high-strength fibers, such as aramid fibers, polyethylene fibers, polyarylate fibers, or carbon fibers; or a rubber belt.

The filtering apparatus of the present invention is a filtering apparatus which filters a material. The filtering apparatus includes: a plurality of rolls; a filter cloth wound around the plurality of rolls and traveling therealong; a supply device which supplies the material onto the filter cloth; a filtering device arranged ahead of the supply device in a traveling direction of the filter cloth; and the solid-liquid separating device disposed ahead of the filtering device in the traveling direction of the filter cloth. A roll of the plurality of rolls which is located ahead of the filtering device in the traveling direction of the filter cloth is the separating roll of the solid-liquid separating device, and the filter cloth is any one of the pair of separating filter cloths of the solid-liquid separating device.

Accordingly, in such a filtering apparatus, such as the horizontal vacuum filtering apparatus described above, the roll of the filtering apparatus which is located ahead of the filtering device in the traveling direction is used as the separating roll of the solid-liquid separating device, and the filter cloth of the filtering apparatus is any one of the pair of separating filter cloths of the solid-liquid separating device. Thus, the material on the filter cloth filtered by the filtering device is moved toward the front side of the filtering device in the traveling direction of the filter cloth, i.e., to the subsequent stage of the filtering device continuously, is sandwiched between the one separating filter cloth and another separating filter cloth, and is wound around the other separating roll along with the squeezing belt, whereby the material is squeezed and ventilated, and is effectively dehydrated as described above.

Here, in the solid-liquid separating device of the present invention, the squeezing belt is wound around the outer circumference of the pair of separating filter cloths wound around the separating roll as described above. Therefore, a decrease in the frictional force between the separating roll and the separating filter cloths by ventilation can be suppressed, and the separating filter cloths can be pressed against the separating roll by sufficient expression pressure, and can be reliably made to travel in the rotational direction with the rotation of a separating roll.

The separating roll of the solid-liquid separating device may be a drive roll which makes the filter cloth to travel.

This makes it possible to suppress a decrease in the driving force to achieve stable traveling of the filter cloth.

Consequently, even if a secondary dehydrator, such as a centrifuge and a filter press, is not additionally required to prepare at the subsequent stage of this filtering apparatus, the material having small liquid content can be obtained, which is efficient. Also, it is possible to ease the burden of a drying device used when the material dehydrated in this way is dried. Moreover, since the filter cloth and rolls of the filtering apparatus can be utilized as separating filter cloth and separating rolls of a solid-liquid separating device, this is also economical. Also, since the solid-liquid separating device can also deal with continuous supply of the material, the liquid content of the material can be reliably reduced even in a horizontal vacuum filtering apparatus, a drum type vacuum filtering apparatus, and a filtering apparatus like a beltpress dehydrator, in which a filter cloth travels continuously.

Effects of the Present Invention

As described above, according to the solid-liquid separating device and the solid-liquid separating method of the present invention, the material is sandwiched between the pair of separating filter cloths wound around the rotating separating roll so as to overlap each other. Thereby, the material can be effectively squeezed by making a shearing force in the circumferential direction act thereon, in addition to the pressing force in the radial direction of the separating roll. Moreover, it becomes possible to perform ventilation in this radial direction to effectively separate the liquid component. Additionally, according to the filtering apparatus of the present invention, the material with lower liquid content can be obtained efficiently and economically using such a solid-liquid separating device, without requiring a secondary dehydrator. Additionally, when a product is conveyed to such a drying device at the subsequent stage, it is possible to solve conveyance troubles resulting from adhesion to a conveyor, such as a belt conveyor or a screw conveyor.

As described above, according to the solid-liquid separating device and the solid-liquid separating method of the present invention, the material is sandwiched between the pair of separating filter cloths wound around the rotating separating roll, and the squeezing belt is wound around the outer circumference of the separating roll, and is made to travel in the rotational direction with the rotation of the separating roll. Thereby, the material can be effectively squeezed by making a shearing force in the circumferential direction act thereon, in addition to the pressing force in the radial direction of the separating roll. Moreover, the squeezing belt can prevent the separating filter cloths from floating from the separating roll due to radial ventilation and prevent the cake from being blown off from end of the separating filter cloths due to the radial ventilation. As a result, it is possible to effectively separate a liquid component of the material.

According to the filtering apparatus of the present invention, the material with lower liquid content can be obtained efficiently and economically using such a solid-liquid separating device, without requiring a secondary dehydrator. Additionally, when a product is conveyed to such a drying device at the subsequent stage, it is possible to solve conveyance troubles resulting from adhesion to a conveyor, such as a belt conveyor or a screw conveyor. Additionally, a decrease in the frictional force between the separating roll and the separating filter cloths by ventilation can be suppressed, and the separating filter cloths can be reliably made to travel integrally in the rotational direction of the separating roll by the squeezing belt. Thus, even if the separating roll is used as a drive roll of a filtering apparatus, such as a horizontal vacuum filtering apparatus, and the separating filter cloths are used as filtering device of this filtering apparatus, stable traveling of the filter cloths can be achieved.

[Description of Reference Numerals and Signs]

| | |
|---|---|
| 1. | FILTER CLOTH (SEPARATING FILTER CLOTH) |
| 2, 10. | ROLL |
| 2A. | DRIVE ROLL |
| 2B. | SEPARATING ROLL |
| 3. | SUPPLY DEVICE |
| 4. | FILTERING DEVICE |
| 5. | SEPARATING FILTER CLOTH |
| 9. | VENTILATION CHAMBER |
| 12. | SUCTION PORTION |
| 13. | SCRAPING PORTION |
| 101. | FILTER CLOTH (SEPARATING FILTER CLOTH) |
| 102, 114, 116. | ROLL |
| 102A. | DRIVE ROLL |
| 103. | SUPPLY DEVICE |
| 104. | FILTERING DEVICE |
| 107. | SEPARATING ROLL |
| 108. | SEPARATING FILTER CLOTH |
| 109. | THROUGH HOLE |
| 110. | VENTILATION CHAMBER |
| 111. | VENTILATION PIPE |
| 113. | AUTOMATIC VALVE |
| 115. | SQUEEZING BELT |
| 117. | SQUEEZING BELT TENSIONING DEVICE |
| A. | VENTILATION GAS (AIR) |
| P. | MATERIAL |
| F. | TRAVELING DIRECTION OF THE FILTER CLOTH 1 OR THE FILTER CLOTH 101 |
| G | TRAVELING DIRECTION OF THE SEPARATING FILTER CLOTH 108 |
| H. | TRAVELING DIRECTION OF THE SQUEEZING BELT 115 |
| T. | ROTATIONAL DIRECTION OF THE SEPARATING ROLL 107 |

BEST MODE FOR CARRYING OUT THE INVENTION

Figure 1:
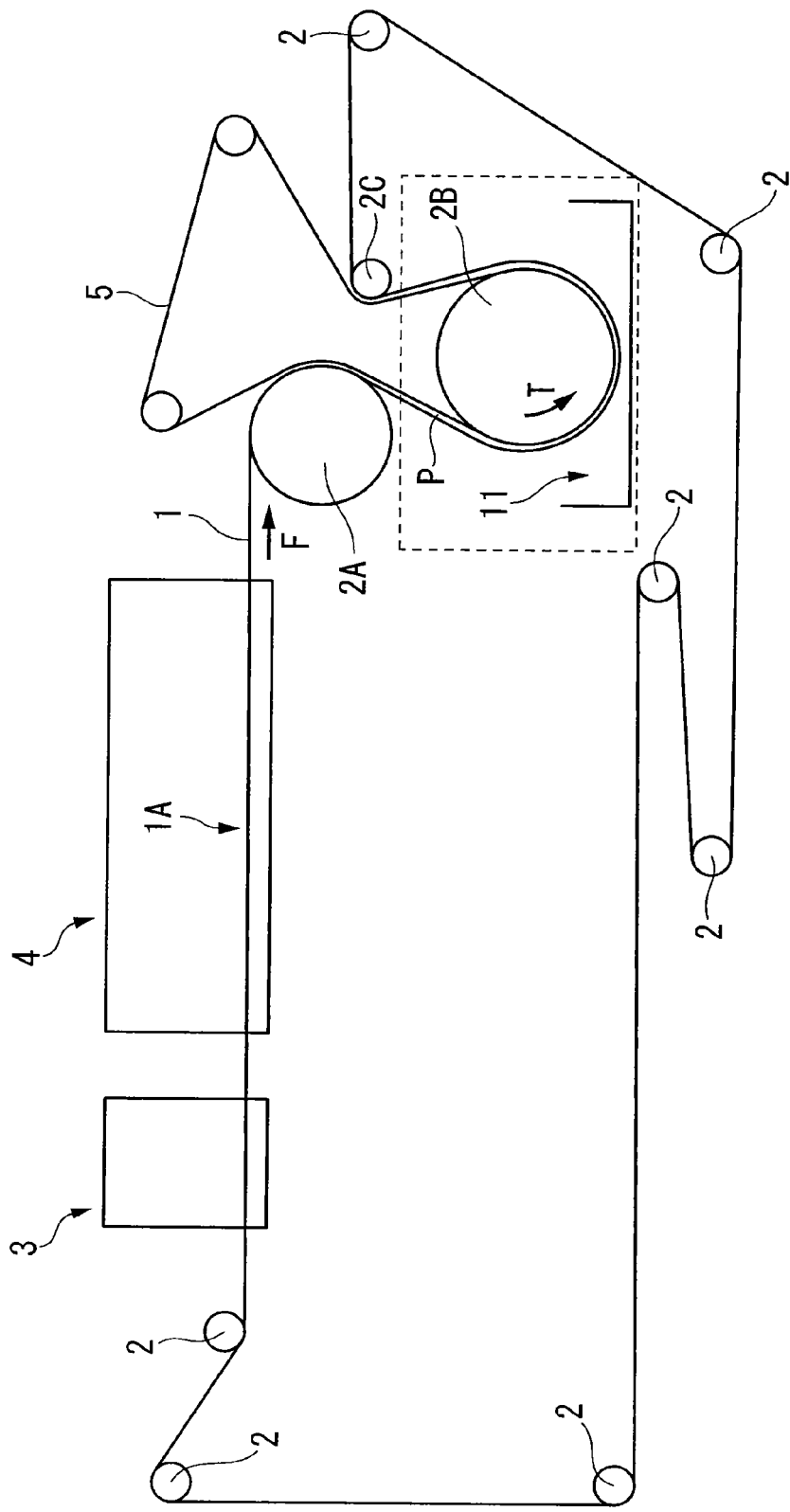
FIG. 1 is a schematic side view showing a first embodiment of a filtering apparatus of the present invention.

FIGS. 1 to 6 show a first embodiment of a solid-liquid separating device and a filtering apparatus including the solid-liquid separating device of the present invention. The filtering apparatus in this embodiment is the configuration of a horizontal vacuum filtering apparatus. As shown in FIG. 1, a filter cloth 1 which is endless is wound around a plurality of rolls 2 which are arranged parallel to each other with their axes being made horizontal, and is stretched horizontally so as to go therearound. As one of these rolls is used as a drive roll 2A and is rotationally driven around its axis, a horizontal portion 1A of the filter cloth 1 which is stretched at an upper portion of the apparatus is able to travel so as to move in a traveling direction indicated by an arrow F. A material P supplied from a supply device 3 disposed behind the horizontal portion 1A in the traveling direction F is filtered via the filter cloth 1 by a filtering device 4 disposed between the supply device 3 and the drive roll 2A immediately ahead of the horizontal portion in the traveling direction F.

The drive roll 2A is located at a front end of the horizontal portion 1A in the traveling direction F, and is rotated by a driving device (not shown) to make the filter cloth 1 travel continuously or intermittently at predetermined pitches. Additionally, in filtering device 4, a liquid component of the material P is sucked up and filtered via the filter cloth 1 by a vacuum tray (not shown) which supports the filter cloth 1 in the horizontal portion 1A. The solid-liquid separating device of the first embodiment of the present invention, as indicated by a broken line in FIG. 1, is disposed further ahead of the filtering device 4 in the traveling direction F.

Figure 2:
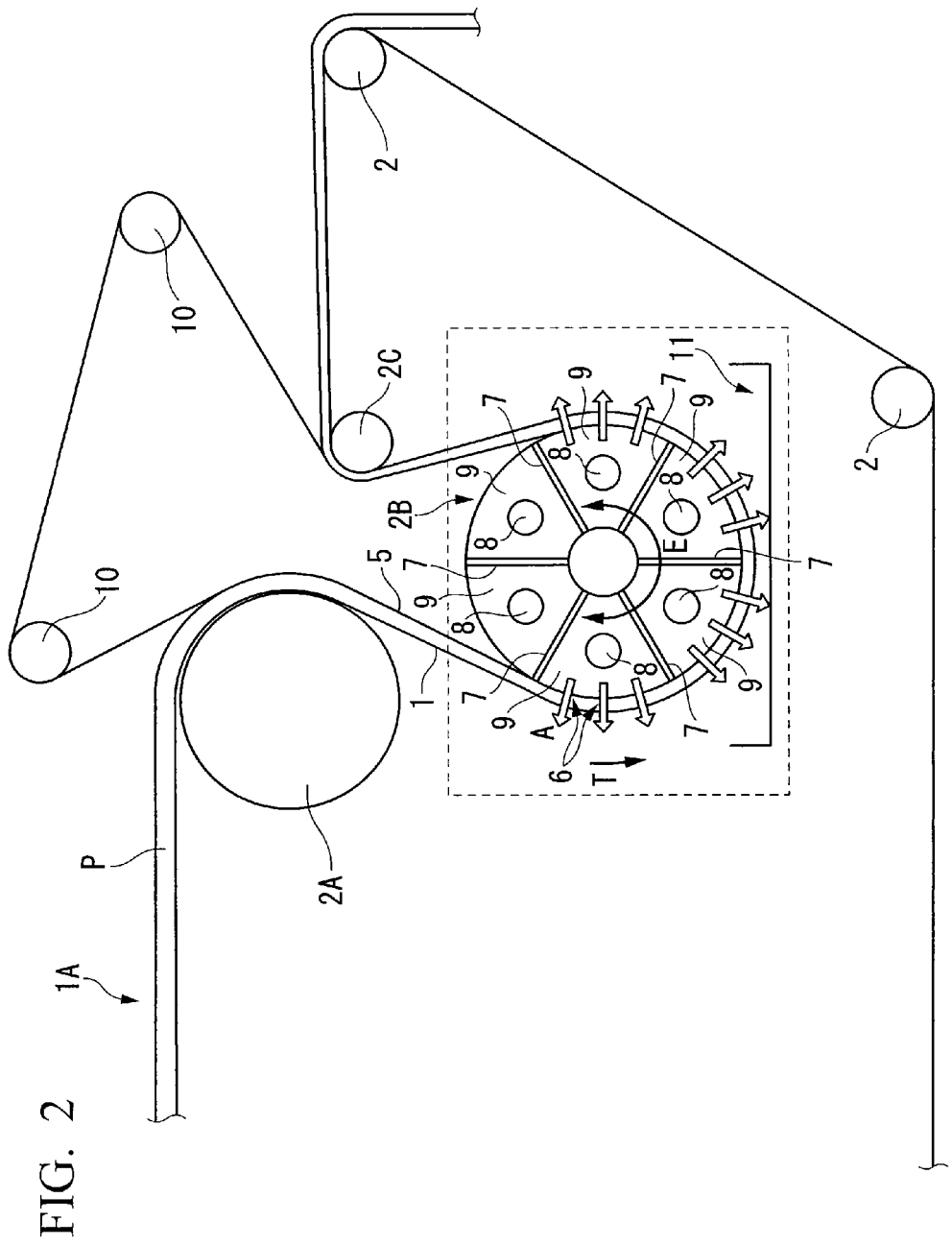
FIG. 2 is a schematic side view showing a solid-liquid separating device used for the filtering apparatus of the embodiment.

In the solid-liquid separating device of this embodiment, as shown in FIG. 2, a pair of endless separating filter cloths 1 and 5 is adapted to travel along a rotational direction T while the pair of filter cloths is wound around an outer circumference of a separating roll 2B rotated in a circumferential direction toward the rotational direction T so as to overlap each other. A roll located next to the drive roll 2A in the traveling direction F among the rolls 2 in the filtering apparatus is used as the separating roll 2B. Additionally, the filter cloth 1 of the filtering apparatus is adapted to be wound around the separating roll 2B as one of the pair of separating filter cloths 1 and 5 without any change.

The separating roll 2B is disposed below the drive roll 2A at a distance therefrom such that their circumferential surfaces overlap each other in plan view. In addition, the rolls 2 of the filtering apparatus other than the drive roll 2A and the separating roll 2B are adapted to have a sufficiently smaller diameter than the drive roll 2A and the separating roll 2B. A roll 2C next to the separating roll 2B in the traveling direction F among these rolls 2 is disposed above the drive roll 2B at a distance therefrom such that their circumferential surfaces also overlap each other in plan view.

Figure 3:
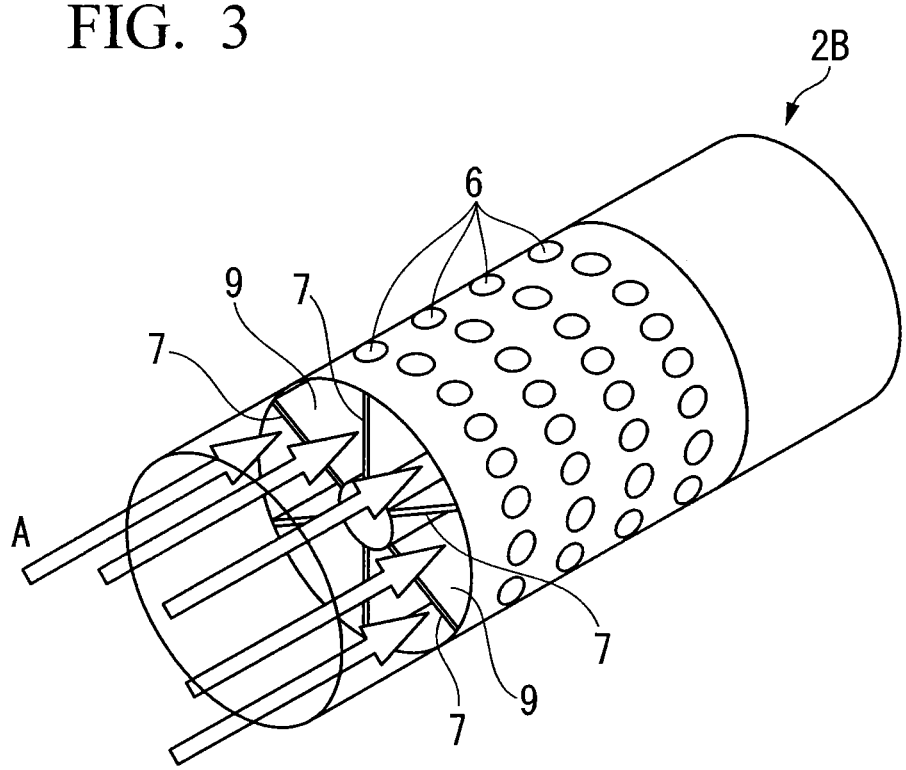
FIG. 3 is a partially broken perspective view showing a separating roll 2B of the solid-liquid separating device of the embodiment.

The separating roll 2B, as shown in FIG. 3, is formed in a substantially hollow cylindrical shape, and a number of through holes 6 are opened on a cylindrical surface portion of the separating roll inside the area of the width of the filter cloth 1 in the direction of an axis of the separating roll 2B. Meanwhile, a plurality of partition plates 7 which radially extends from the axis portion and reaches the cylindrical surface portion in a cross-section orthogonal to the axis are arranged at equal angles in the circumferential direction within an area in which the through holes 6 are formed inside the substantially hollow separating roll 2B. Both ends of the partition plates 7 in the direction of the axis are closed by circular end plates. Each of ventilation pipes 8 with the same number as the partition plates 7 is connected to one end plate so as to communicate with a space between a pair of partition plates 7 adjacent to each other in the circumferential direction.

Ventilation chambers 9 which communicate with the through holes 6 from the ventilation pipes 8 are isolated from each other and formed at approximately equal intervals in the circumferential directions by the same number as the partition plates 7 and the ventilation pipes 8 inside the separating roll 2B. A ventilation fluid, such as air (compressed air) A or steam, which is supplied to each ventilation pipe 8, is ejected and ventilated to the outer circumference of the separating roll 2B from the through hole 6 via the ventilation chamber 9. In addition, the air A to be supplied to the ventilation pipes 8 is supplied to the ventilation pipes 8 fixed to the separating roll 2B to rotate via a rotary joint or a multi-stage rotary joint from a supply source (not shown). A valve mechanism (not shown), which performs the control of supplying the air A to only the ventilation chambers 9 in predetermined rotational positions within an area (a span denoted by reference numeral E in FIG. 2) where the separating filter cloths 1 and 5 are wound in the circumferential direction of the separating roll 2B, is interposed between the rotary joint or the like and each ventilation pipe 8. With the rotation of the separating roll 2B, the ventilation chambers 9 in predetermined rotational positions are switched sequentially.

The other separating filter cloth 5 of the pair of separating filter cloths 1 and 5 is adapted to have a width equal to the filter cloth (one separating filter cloth) 1, is wound around the inside of the filter cloth 1 at the outer circumference of the separating roll 2B, and is also wound around the outside of the filter cloth 1 at the outer peripheries of the drive roll 2A and the roll 2C. Moreover, the separating filter cloth 5 is located above the drive roll 2A and the roll 2C, is wound around a pair of rolls 10 whose length is made larger than the distance between the drive roll 2A and the roll 2C, and is disposed in an endless fashion. Also, the separating filter cloth 5 is adapted to be able to travel along the traveling direction F of the filter cloth 1 in a portion wound along with the filter cloth 1.

In the filtering apparatus and the solid-liquid separating device, the rolls 2 and 10, including the separating roll 2B, other than drive roll 2A are used as driven rolls which are all not connected to a driving device. Moreover, at least one of the rolls 2 of the filtering apparatus excluding the separating roll 2B and at least one of the rolls 10 of the solid-liquid separating device is respectively provided with tension control device which control the tension of the filter cloth 1 and the separating filter cloth 5 to a predetermined strength, for example, by biasing the rolls 2 and 10 away from the other rolls 2 and 10. Additionally, in the solid-liquid separating device, a pan 11 is disposed below the separating roll 2B.

In the filtering apparatus provided with such a solid-liquid separating device, the material P filtered by the filtering device 4, as shown in FIG. 2, is sandwiched between the pair of separating filter cloths 1 and 5 from the outer circumference of the drive roll 2A, is supplied to the solid-liquid separating device, and is wound around the separating roll 2B along with the separating filter cloths 1 and 5. Then, the separating filter cloth 5 is separated in the roll 2C, and is peeled off and recovered from the filter cloth 1 in the roll 2 next to the roll 2C in the traveling direction F.

In the first embodiment of the solid-liquid separating device of the above configuration and a solid-liquid separating method of the present invention using this, the material P is sandwiched between the pair of separating filter cloths 1 and 5 at the outer circumference of the separating roll 2B. Particularly, as a predetermined tension is applied to the filter cloth 1 wound around the outside of the material P by the tension control device, the material receives a pressing force toward the radial inner side of the separating roll 2B, and is squeezed. Moreover, in this separating roll 2B, the air A is continuously ejected from the through holes 6 via the ventilation chambers 9 in an area of predetermined rotational position within a area where the separating filter cloths 1 and 5 are wound as described above from the ventilation pipes 8, and is ventilated toward the radial outer side of the separating roll 2B through the separating filter cloth 5, the material P, and the separating filter cloth 1. Accordingly, the liquid component squeezed from the material P is separated from the material P via the separating filter cloth 1, and is dropped and recovered to the pan 11.

Moreover, the pair of separating filter cloths 1 and 5 which sandwiches the material P therebetween and is wound around the separating roll 2B differ in the distance from the axis of the separating roll 2B by the thickness of the material P. Additionally, one separating filter cloth 1 is wound directly around the drive roll 2A and travels therealong, whereas the other separating filter cloth 5 is made to travel via the one separating filter cloth 1 and the material P. Consequently, a circumferential speed difference is caused between the pair of separating filter cloths 1 and 5 at the outer circumference of the separating roll 2B. Accordingly, a shearing force which is going to shear the material P in the circumferential direction acts on the material P due to this circumferential speed difference, and the material P is efficiently squeezed by the shearing force and the pressing force. Moreover, since the material is dehydrated by ventilation, the liquid content of the material P in which sufficient solid liquid separation was conventionally difficult can also be sufficiently reduced.

In the solid-liquid separating device and the solid-liquid separating method, as described above, dehydration of the material P is performed at the outer circumference of the separating roll 2B which rotates along with the traveling of the filter cloth 1. Consequently, even when the traveling of the filter cloth 1 in the filtering apparatus is continuous or intermittent, efficient dehydration can be achieved by the pressing force and the shearing force, and further the ventilation. Accordingly, the solid-liquid separating device can also be correspondingly applied to, for example, a horizontal vacuum filtering apparatus in which the filter cloth 1 is clamped, and intermittently moved and made to travel in the traveling direction F at a predetermined stroke as well as the case where the drive roll 2A is continuously or intermittently rotated to make the filter cloth 1 to travel.

Meanwhile, in the filtering apparatus of the above configuration including such a solid-liquid separating device, the roll 2 next to the drive roll 2A ahead of the filtering device 4 in the traveling direction F is used as the separating roll 2B in the solid-liquid separating device. Additionally, one of the pair of separating filter cloths 1 and 5 of the solid-liquid separating device is used as the filter cloth 1 itself which filters the material P in the filtering device 4. Consequently, the material P on the filter cloth 1 filtered by the filtering device 4 can be supplied to the solid-liquid separating device continuously by the traveling of the filter cloth 1, and can be efficiently dehydrated as described above.

Accordingly, it is not necessary that the material P filtered by the filtering device 4 of the filtering apparatus is recovered from the filtering apparatus at once, and is dehydrated by a secondary dehydrator, such as a centrifuge or a filter press, which is provided separately from the filtering apparatus. Additionally, since the solid-liquid separating device can also be applied to, for example, a filtering apparatus, such as an established horizontal vacuum filtering apparatus, to such a degree that some modification is made thereto, it is economical. Additionally, the liquid content can be sufficiently reduced as described above. Therefore, for example, when an attempt to dry the material P whose liquid component has been separated is made in a subsequent-stage drying device, the burden on the drying device can be eased. Additionally, even when products are conveyed to the subsequent-stage drying device, it is possible to solve troubles caused by the material P with a large liquid component adhering to a conveying apparatus, such as a belt conveyor or a screw conveyor.

In the solid-liquid separating device of this embodiment, the plurality of ventilation chambers 9 which is ventilated in the radial direction of separating roll 2B via the through holes 6 is isolated from each other and formed at substantially equal angles in the circumferential direction inside the separating roll 2B. For example, since ventilation is performed even in a portion which is not involved in the dehydration other than the area E where the pair of separating filter cloths 1 and 5 which sandwich the material P therebetween is wound around the separating roll 2B, the air A for ventilation can be prevented from being wasted, and the material P can be intensively ventilated by the ventilation chambers 9 in the area E.

All the ventilation chambers 9 in the rotational positions of the area E where the separating filter cloths 1 and 5 are wound may be supplied with the air A. However, in order to suppress increase of operating cost, such as electric power or facility cost due to increase of the supply of the air A more than needed, it is preferable to perform control so that the air A is supplied only to the ventilation chambers 9 in predetermined rotational positions. Thereby, the material can be dehydrated more efficiently. That is, by selecting the ventilation chambers 9 and performing ventilation by a valve mechanism, in predetermined rotational positions, ventilation is always performed continuously irrespective of the rotation of the separating roll 2B and dehydration is achieved. On the other hand, since ventilation is not performed in positions other than these positions, it is possible to more reliably suppress consumption of unnecessary air A or the like.

Meanwhile, in the solid-liquid separating device of this embodiment, a liquid component of the material P squeezed at the outer circumference of the separating roll 2B are separated and dehydrated by ventilation fluids, such as the air A, which are ventilated from the through holes 6 at the outer surface of the separating roll 2B on the inner side of the material. The liquid component separated from the material P is dropped into and recovered from the pan 11 as described above. However, since particularly in this embodiment, the separating filter cloths 1 and 5 and the material P are wound around the bottom of the separating roll 2B, the separated liquid component goes round into the bottom of the separating roll 2B without being dropped to the pan 11, and permeates again into the material P through the separating filter cloth 1 which is located on the outer side. Thus, there is a probability that a decline in the liquid content of the material P is obstructed.

Figure 4A:
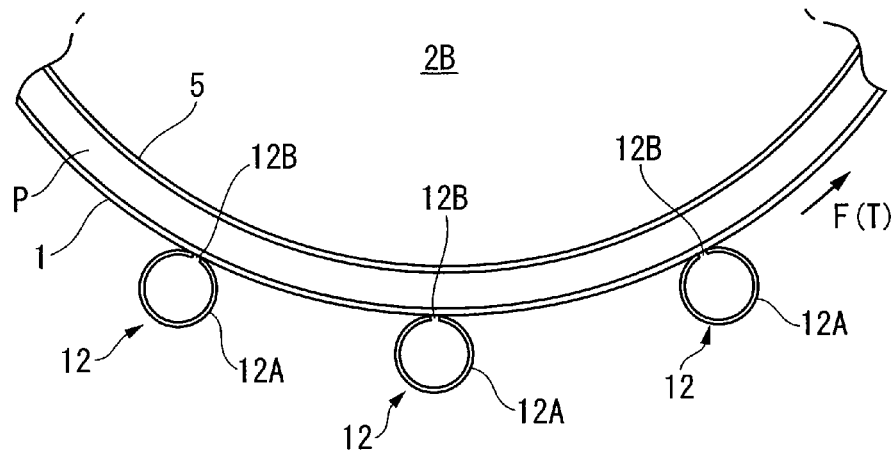
FIG. 4A is a partially sectional view of the bottom of the separating roll 2B showing a modification of the solid-liquid separating device of the embodiment.
Figure 4B:
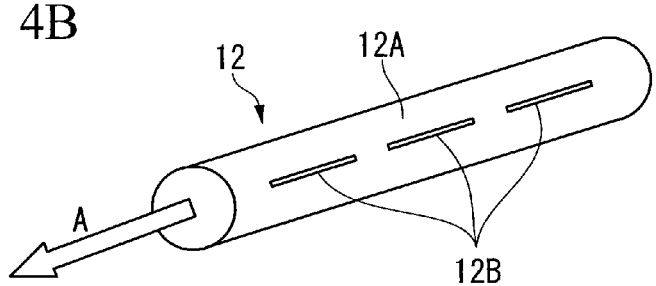
FIG. 4B is a perspective view of a suction pipe 12A of the modification of the solid-liquid separating device of the embodiment.
Figure 5:
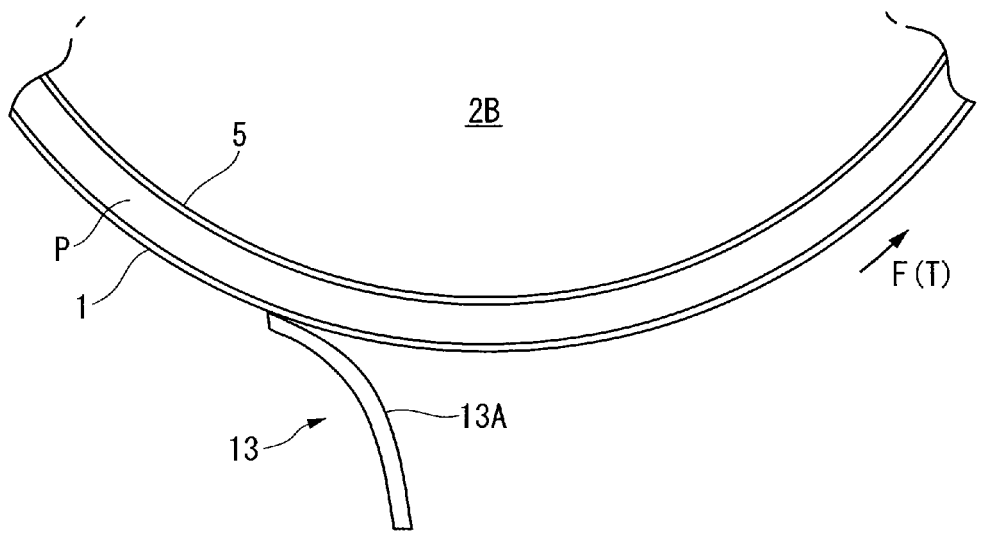
FIG. 5 is a partially sectional view of the bottom of the separating roll 2B showing another modification of the solid-liquid separating device of the embodiment.
Figure 6:
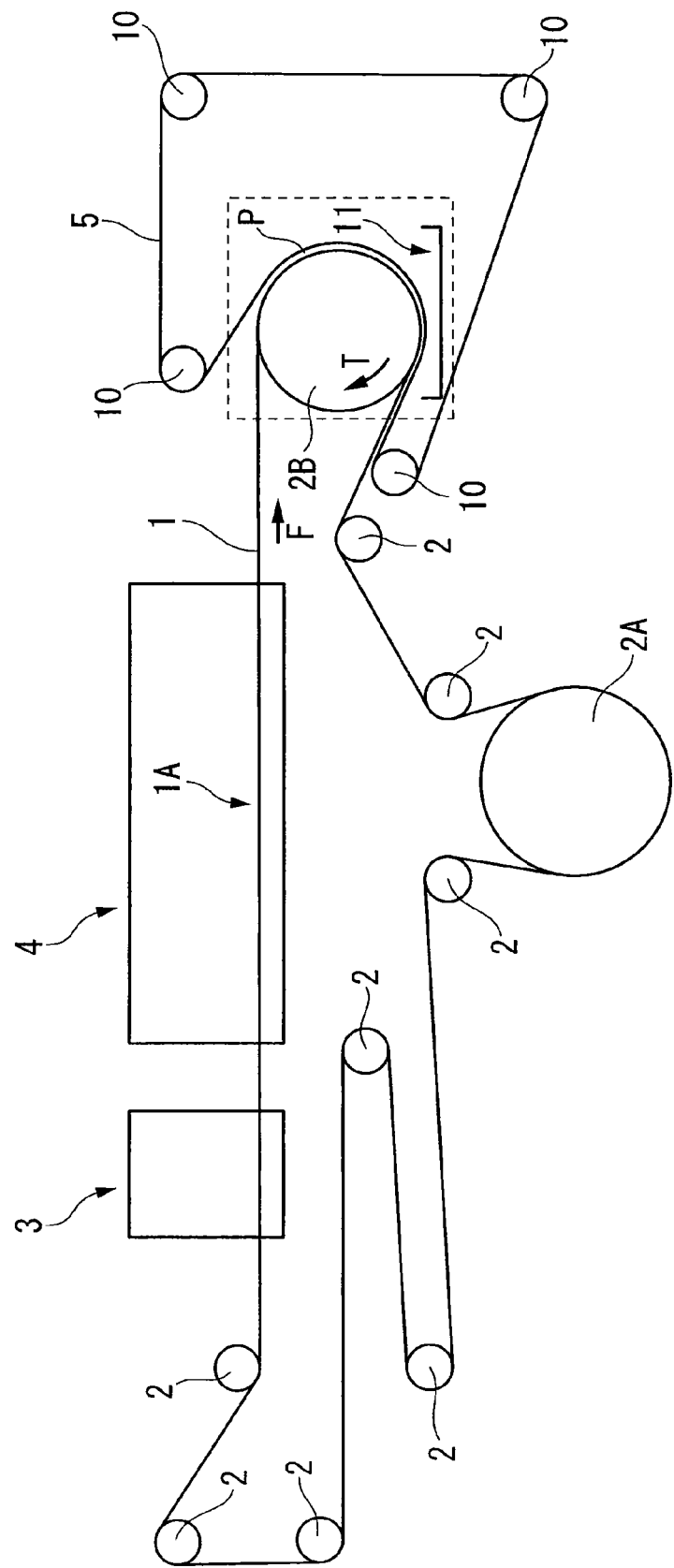
FIG. 6 is a schematic diagram showing a modification of the filtering apparatus shown in FIG. 1.

In such a case, instead of the pan 11 or in combination with the pan 11, as shown in FIG. 4 or 5, it is desirable that liquid component removing portion which removes a liquid component, which has been separated from the material P, from the outer separating filter cloth 1, is disposed on the outer side of the outer separating filter cloth 1.

In FIG. 4, this liquid component removing portion is suction portion 12 which sucks up and recovers a liquid component separated from the material P. As shown, for example, in FIG. 4B, the suction portion 12 is obtained by forming a plurality of slits 12B, which extends parallel to the centerline of a circular tubular suction pipe 12A, shown in a arrow, at intervals in the direction of the axis in the suction pipe 12A so as to pass through the suction pipe radially. One end of this suction pipe 12A is closed, and a suction device, such as a pump (not shown) which sucks up the air A, is connected to the other end of the suction pipe.

The liquid component removing portions (suction portions 12) shown in FIG. 4 are disposed such that the axis of the suction pipe 12A is parallel to the axis of the separating roll 2B as shown in FIG. 4A, a plurality of slits 12B is disposed at intervals in the circumferential direction at the bottom of the separating roll 2B so as to face or touch the outer separating filter cloth 1. Accordingly, a liquid component which goes round into the bottom of the separating roll 2B is sucked up and recovered along with the air A from the slits 12B of the suction pipe 12A in the suction portion 12. Consequently, the liquid component can be prevented from permeating again into the material P through the separating filter cloth 1, and the liquid content of the material P can be reduced more reliably.

Instead of the liquid component removing portion comprised of such a suction portion 12 or in combination with this, as shown in FIG. 5, a scraping portion 13 which scrapes and removes a liquid component, which has been separated from the material P, from the separating filter cloth 1, may be disposed on the outer side of the outer separating filter cloth 1 as the liquid component removing portion. The scraping portion 13 is, for example, a scraper 13A made of an oblong plate material having elasticity, such a rubber plate, and is disposed such that one side edge thereof is bent and brought into sliding contact with the outer circumference of the separating filter cloth 1. In FIG. 5, such a scraper 13A is arranged slightly backward from directly under the axis of the separating roll 2B in the traveling direction F of the separating filter cloth 1, and also touches the outer circumference of the separating filter cloth 1 such that one side edge thereof is bent backward in the traveling direction F.

Accordingly, even in such liquid component removing portion (scraping portion 13), the liquid component which has gone around into the bottom of the separating roll 2B is removed from the surface of the separating filter cloth 1 so as to be scraped by the scraper 13A of the scraping portion 13 along with the traveling of the separating filter cloth 1, and is dropped using the scraper 13A. Therefore, since the liquid component is recovered by the pan 11 or the like, the liquid component can be prevented from permeating again into the material P. In addition, although only one scraping portion 13 is shown in FIG. 5, a plurality of scraping portion 13 may be provided at intervals in the circumferential direction of the separating roll 2B.

Meanwhile, in the filtering apparatus of the above embodiment, the drive roll 2A is disposed immediately ahead of the filtering portion 4 in the traveling direction F, and the roll 2 next to the drive roll is used as the separating roll 2B of the solid-liquid separating device. However, for example, like the horizontal vacuum filtering apparatus shown in FIG. 6, the roll 2 which is located ahead of the filtering portion 4 in the traveling direction F and forms the horizontal portion 1A of the filter cloth 1 may be used as the separating roll 2B of the solid-liquid separating device, and the drive roll 2A may be provided, for example, in a position where the filter cloth 1 goes around a lower portion of the filtering apparatus, closer to an operator than the supply device 3 in the traveling direction F ahead of the solid-liquid separating device in the traveling direction F separately from this. That is, in the filtering apparatus in which the material P is supplied onto the filter cloth 1 wound around the plurality of rolls 2 and filtered by the filtering device 4 like the horizontal vacuum filtering apparatus, the solid-liquid separating device of the present invention can also be disposed even if an arbitrary roll 2 is used as the separating roll 2B within an area where the material P which has been filtered is on the filter cloth 1. However, in the case shown in FIG. 6, the filter cloth 1 which filters the material P in the filtering device 4 is wound around the separating roll 2B in contact therewith as an inner separating filter cloth, and the separating filter cloth 5 of the solid-liquid separating device is wound around the outer side of the separating roll 2B with the material P therebetween as an outer separating filter cloth.

It is also possible to share the drive roll 2A and the separating roll 2B. However, when the air A is ejected from the outer surface of the separating roll 2B to perform ventilation like the solid-liquid separating device of this embodiment, any friction with the separating roll 2B and the filter cloth 1 decreases and slip occurs. Thus, there is a probability that it may be difficult to reliably make the filter cloth 1 travel at a predetermined speed or at a predetermined pitch. Therefore, it is desirable that the drive roll 2A and separating roll 2B of the solid-liquid separating device which make the filter cloth 1 travel are provided independently. Here, if a sufficient frictional force for the traveling of the filter cloth 1 can be generated, for example, by making a sufficient squeezing pressure act, it is also possible to share the drive roll 2A and separating roll 2B in this way. That is, it is possible to dispose the solid-liquid separating device of the present invention even if an arbitrary roll 2 is used as the separating roll 2B.

Hereinafter, the effects of the present inventions will be demonstrated by means of a working example of the present invention. In this working example, the filtering apparatus of the embodiment shown in FIGS. 1 to 3 was used to supply the material P to the solid-liquid separating device of the embodiment provided in the filtering apparatus, thereby separating a liquid component, and to change (increase) the pressure of the air A which is ventilated from the separating roll 2B at that time, thereby measuring the liquid content of the cake dehydrated by the solid-liquid separating device. Materials P are four kinds of materials (samples A to D) in which the particle size of a solid is 2.5 μm to 30 μm, and are cakes with different liquid contents, which are filtered only by vacuum dehydration in the filtering device 4.

Here, the separating filter cloths 1 and 5 used in this working example had an air permeability of 0.5 to 5 cc/sec/cm², and the separating roll 2B was formed by piercing the through holes 6 with a diameter of 5 mm at a pitch of 8 mm in the cylindrical surface portion. Additionally, cake thickness in the solid-liquid separating device was 3 to 10 mm, dehydration time was 10 to 30 sec, and squeezing pressure was 0.1 to 0.3 MPaG.

Figure 7:
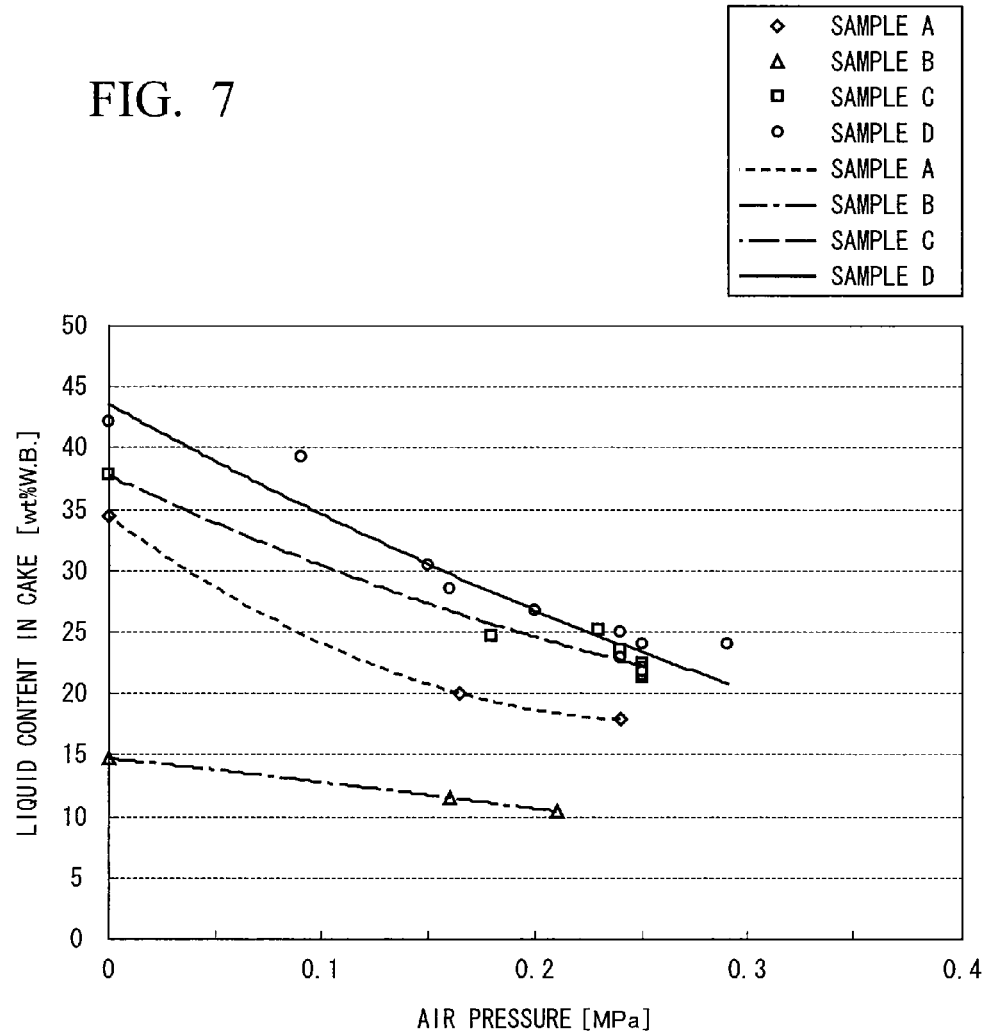
FIG. 7 is a view showing the relationship between air pressure and cake liquid content in respective samples A to D in the embodiment of the present invention.

These results for the respective samples A to D are shown in the following Tables 1 to 4 in combination with liquid contents of only vacuum dehydration. Additionally, the samples A to D are grouped, and the relationship between air pressure and cake liquid content and tendency thereamong are shown in FIG. 7.

TABLE 1

| Air Pressure | MPa | Only Vacuum Dehydration | 0.17 | 0.24 |
|---|---|---|---|---|
| Liquid Content of Cake | wt % W.B | 34.39 | 20.03 | 17.88 |

TABLE 2

| Air Pressure | MPa | Only Vacuum Dehydration | 0.16 | 0.21 |
|---|---|---|---|---|
| Liquid Content of Cake | wt % W.B | 14.75 | 11.54 | 10.42 |

TABLE 3

| Air Pressure | MPa | Only Vacuum Dehydration | 0.18 | 0.23 | 0.24 | 0.25 | 0.25 | 0.25 | 0.25 |
|---|---|---|---|---|---|---|---|---|---|
| Liquid Content of Cake | wt % W.B | 37.80 | 24.75 | 25.23 | 23.64 | 22.51 | 22.11 | 21.33 | 21.31 |

TABLE 4

| Air Pressure | MPa | Only Vacuum Dehydration | 0.09 | 0.15 | 0.16 | 0.20 | 0.24 | 0.24 | 0.25 | 0.25 | 0.25 | 0.29 |
|---|---|---|---|---|---|---|---|---|---|---|---|---|
| Liquid Content of Cake | wt % W.B | 42.10 | 39.31 | 30.53 | 28.45 | 26.82 | 25.00 | 22.98 | 24.06 | 22.05 | 21.76 | 24.70 |

According to the working example of the present invention, it is apparent from the results of Tables 1 to 4 and FIG. 7 that the liquid content decreases compared with cakes of only vacuum dehydration. It can be understood that, particularly in the sample D, the liquid content of cake decreases to about half compared with only vacuum dehydration. Additionally, it can also be understood that the liquid content of cake tends to decrease greatly as the air pressure increases. However, the falling rate of the liquid contents changes according to each sample, and when the amount of air passing through a cake is large, even if the air pressure increases, the whole energy efficiency will also be reduced.

Figure 8:
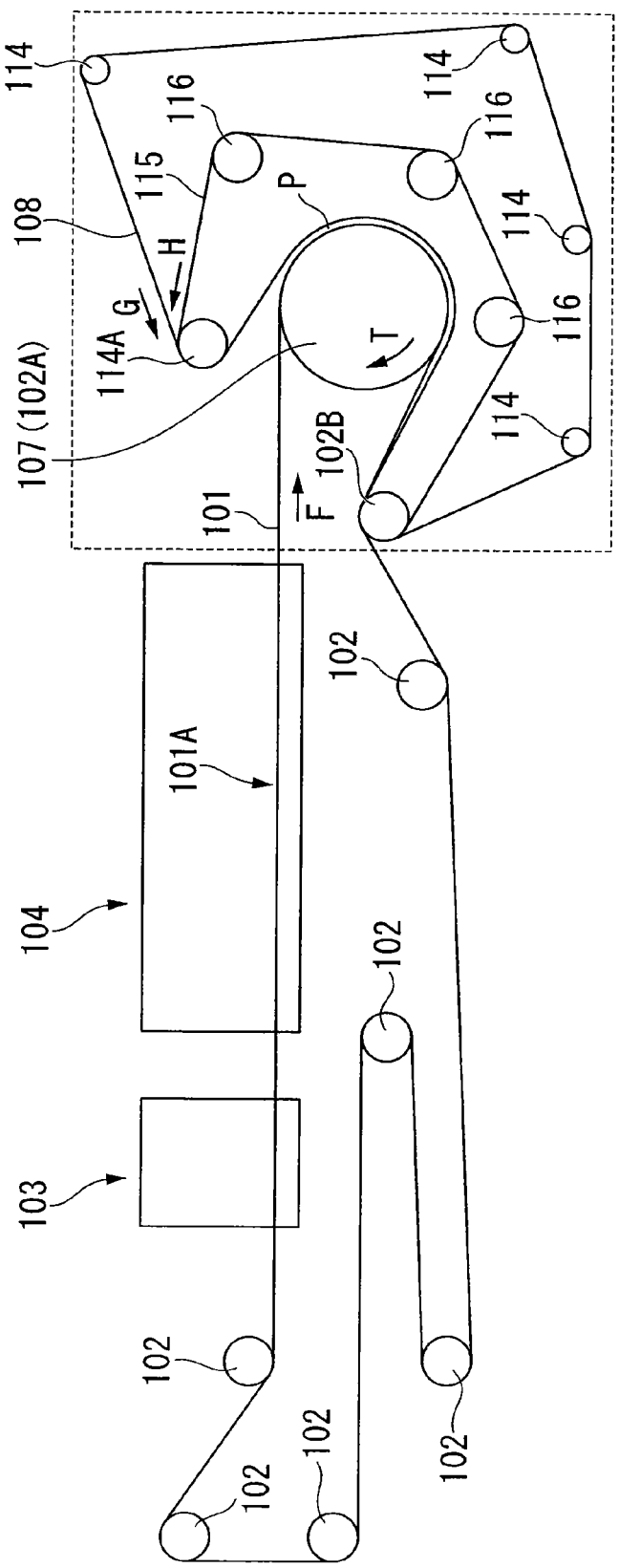
FIG. 8 is a schematic side view showing a second embodiment of the filtering apparatus of the present invention.
Figure 9:
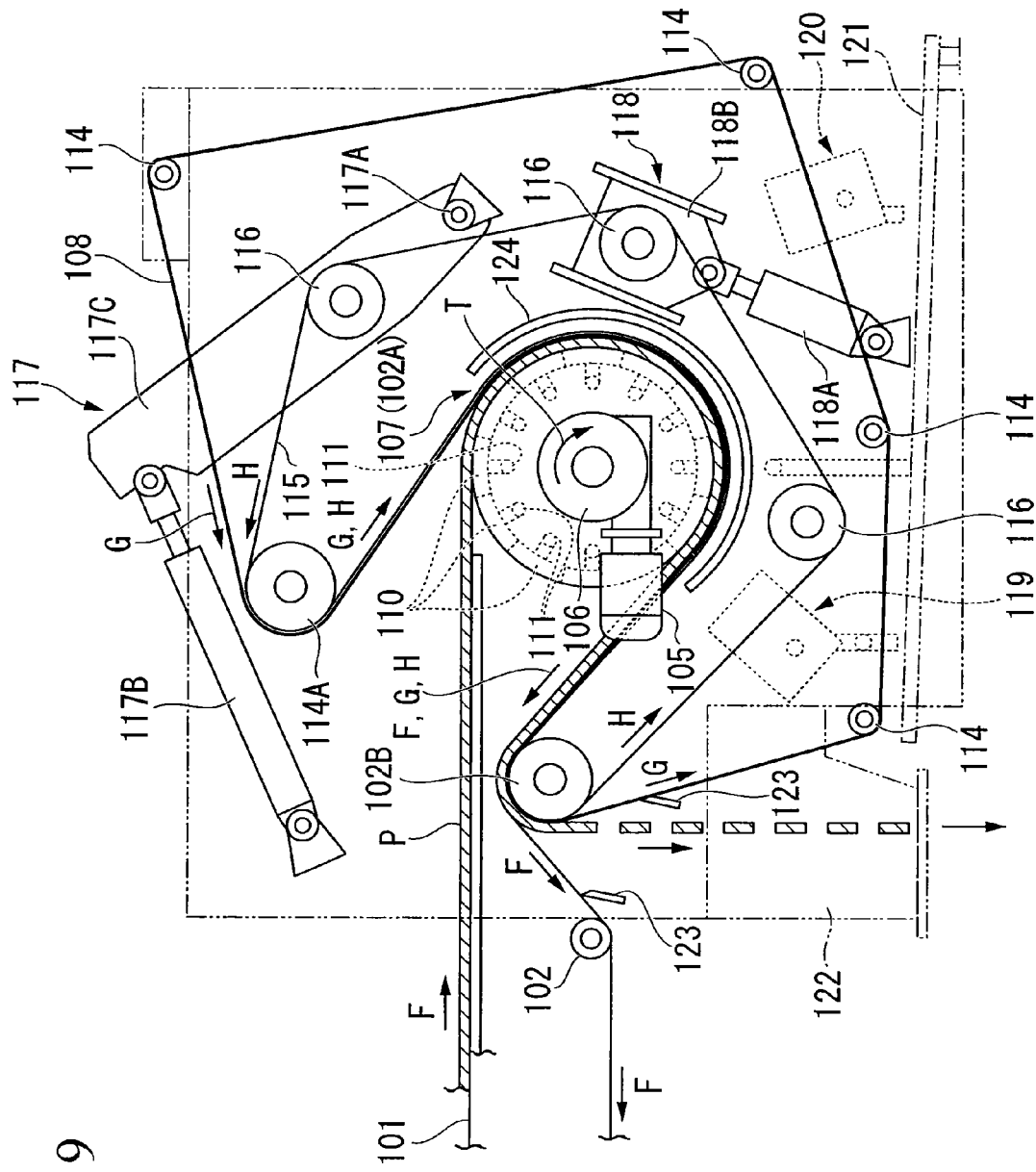
FIG. 9 is a schematic side view showing a solid-liquid separating device used for the filtering apparatus of the embodiment.
Figure 10:
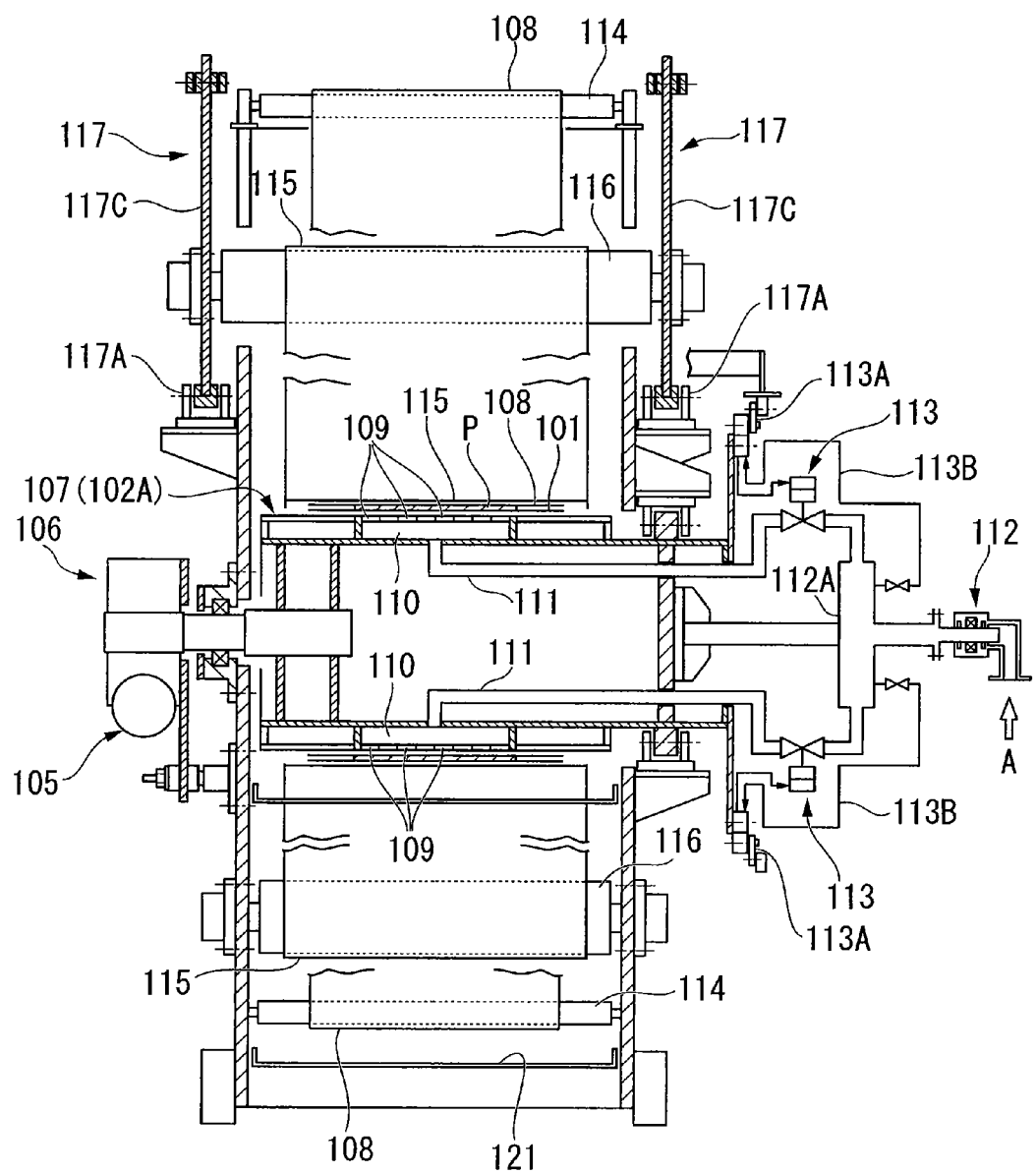
FIG. 10 is a partially broken back view when the solid-liquid separating device of this embodiment is seen from the right of FIG. 9.

FIGS. 8 to 10 show a second embodiment of a solid-liquid separating device and a filtering apparatus including the solid-liquid separating device of the present invention. The filtering apparatus in this embodiment is the configuration of a horizontal vacuum filtering apparatus. As shown in FIG. 8, an endless filter cloth 101 is wound around a plurality of rolls 102 which are arranged parallel to each other with their axes being made horizontal, and is stretched horizontally so as to go thereareound. As one of these rolls is used as a drive roll 102A and is rotationally driven around its axis, a horizontal portion 101A of the filter cloth 101 which is stretched at an upper portion of the apparatus is able to travel so as to move in a traveling direction indicated by an arrow F. A material P supplied from a supply device 103 disposed behind the horizontal portion 101A in the traveling direction F is filtered via the filter cloth 101 by a filtering device 104 disposed between the supply device 103 and the drive roll 102A immediately ahead of the horizontal portion in the traveling direction F.

The drive roll 102A is located at a front end of the horizontal portion 101A in the traveling direction F, and is rotated via a variable reducer 106 by a driving device 105, such as a motor, as shown in FIG. 9, to make the filter cloth 101 travel continuously or intermittently at a predetermined pitch. Additionally, in the filtering device 104, a liquid component of the material P is sucked up and filtered via the filter cloth 101 by a vacuum tray (not shown) which supports the filter cloth 101 in the horizontal portion 101A. The solid-liquid separating device of the second embodiment of the present invention, as indicated by a broken line in FIG. 8, is disposed further ahead of the filtering device 104 in the traveling direction F.

In the solid-liquid separating device of this embodiment, as shown in FIGS. 9 and 10, a pair of endless separating filter cloths 101 and 108 is adapted to travel along a rotational direction T while the pair of filter cloths is wound around an outer circumference of a separating roll 107 rotated in a circumferential direction toward the rotational direction T so as to overlap each other such that the material P filtered by the filtering device 104 is sandwiched therebetween. In addition, the separating filter cloths 101 and 108 are made of polyethylene fibers, polyester fibers, or the like. The drive roll 102A among the rolls 102 in the filtering apparatus is used as the separating roll 107. Additionally, one of the pair of separating filter cloths 101 and 108, i.e., the filter cloth 101 of the filtering apparatus is adapted to be wound around the separating roll 107 without any change.

The separating roll 107 (drive roll 102A) is formed in a substantially hollow cylindrical shape, and as shown in FIG. 10, a number of through holes 109 are opened to a cylindrical surface portion of the separating roll inside the area of the width of the filter cloth 101 in the direction of an axis of the separating roll 107, and over the whole circumference of the separating roll 107 in the circumferential direction. Meanwhile, a plurality of ventilation chambers 110 which communicate with the through holes 109, are isolated from each other and are formed inside the separating roll 107 so as to partition the inside of the separating roll 107 in an arc shape at approximately equal intervals, within almost the same area as an area where the through holes 109 are formed in the direction of the axis and over the whole circumference of the separating roll 107 in the circumferential direction.

Ventilation pipes 111 with the same number as the ventilation chamber 110 are inserted into a further inner portion of the separating roll 107 from one end (right in FIG. 10) in the direction of an axis, and are connected to the ventilation chambers 110. Ventilation gas A, such as air (compressed air) or steam, which is supplied to each ventilation pipe 111, is ejected and ventilated to the outer circumference of the separating roll 107 from the through hole 109 via the ventilation chamber 110. In addition, the ventilation gas A is supplied to the ventilation pipes 111 fixed to the separating roll 107 to rotate via a rotary joint or a multi-stage rotary joint 112 from a supply source (not shown).

Between a ventilation branch chamber 112A on the side of the separating roll 107 connected to the rotary joint 112, and each ventilation pipe 111, an automatic valve 113 is provided in every ventilation pipe 111. Here, the opening/closing operation of the automatic valve 113 is controlled as the ventilation gas A from the ventilation branch chamber 112A is supplied or is not supplied to the automatic valve 113 via a supply pipe 113B as a signal gas by a limit switch 113A which is attached to the separating roll 107 and operates according to the rotational position of each ventilation chamber 110.

By the automatic valve 113 controlled in this way, in this embodiment, the ventilation gas A is continuously supplied to only the ventilation chambers 110 in predetermined rotational positions among the ventilation chambers 110 within an area where the separating filter cloths 101 and 108 are wound in the circumferential direction of the separating roll 107 while being sequentially switched along with the rotation of the separating roll 107. That is, the automatic valve 113 is controlled such that when the ventilation chambers 110 are in the predetermined rotational positions, the automatic valve 113 is opened to always supply the ventilation gas A to the ventilation chambers 110 and eject the ventilation gas from the through holes 109, and when the ventilation chambers are in positions other than the predetermined rotational positions, the automatic valve 113 is closed so as not to perform ventilation.

Meanwhile, the other separating filter cloth 108 of the pair of separating filter cloths 101 and 108, is adapted to have a width approximately equal to the filter cloth (one separating filter cloth) 101, and is adapted to be wound around the outside of the filter cloth 101 at the outer circumference of the separating roll 107 and to be capable of traveling in the same traveling direction G as the traveling direction F integrally with the filter cloth 101 toward the rotational direction T of the separating roll 107 (drive roll 102A). Additionally, the roll 102B, around which the other separating filter cloth 108 is wound, next to the separating roll 107 in the traveling direction G, as shown in FIG. 9, is shared with the roll 102 around which the filter cloth 101 is wound, and the other separating filter cloth 108 is pulled out and separated toward the side opposite to the filter cloth 101 downward from the roll 102B, and is wound in an endless fashion so as to be wound around a plurality of rolls 114 and reach the outer circumference of the separating roll 107 again.

At the outer circumference of the separating roll 107 wound such that the pair of separating filter cloths 101 and 108 overlap each other in this way, a squeezing belt 115 is wound around an outer circumference of the other separating filter cloth 108. The squeezing belt 115 along with the pair of separating filter cloths 101 and 108 is adapted to be able to travel in the same traveling direction H as the traveling directions F and G along the rotational direction T at the outer circumference of the separating roll 107. Here, the squeezing belt 115 includes the same filter cloth as the separating filter cloths 101 and 108 or a metal belt made of made of a metal mesh, a chain, or the like, a resin belt made of high-strength fibers, such as aramid fibers, polyethylene fibers, polyarylate fibers, and carbon fibers, or a rubber belt, and the air permeability of the squeezing belt is made higher than that of the separating filter cloths 101 and 108.

In this embodiment, the squeezing belt 115 is wider than the separating filter cloths 101 and 108, and is wound around the separating roll 107 such that both ends thereof in a width direction, as shown in FIG. 10, cover the separating filter cloths 101 and 108 respectively beyond both ends of the separating filter cloths 101 and 108 in the width direction. However, if the breadth of the squeezing belt 115 is wider than the cake width of the material P which is sandwiched and squeezed between the pair of separating filter cloths 101 and 108, the breadth of the squeezing belt is not necessarily greater than the separating filter cloths 101 and 108, that is, it may be almost equal to those of the separating filter cloths 101 and 108 or may be narrower than those of the separating filter cloths. Moreover, the squeezing belt 115 next to the separating roll 107 in the traveling direction H is wound around the common roll 102B around which the pair of separating filter cloths 101 and 108 are wound. Next, as shown in FIG. 9, the squeezing belt is sequentially wound around a plurality of rolls 116 disposed between the separating roll 107 and the other separating filter cloth 108 wound around the roll 114. Thereafter, the squeezing belt is wound around a roll 114A around which the other separating filter cloth 108 is wound around with the other separating filter cloth 108 just before it reaches the separating roll 107, and is wound in an endless form so as to reach the outer circumference of the separating roll 107 again.

The rolls 102A, 114A, and 116 around which the squeezing belt 115 is wound are adapted to have larger diameters than the rolls 102 and 114 around which only the other separating filter cloths 101 and 108 are wound, and are adapted to have smaller diameters than the separating roll 107. Moreover, one of the plurality of rolls 116 is attached to an arm 117C of a squeezing belt tensioning device 117 which is adapted to be rotatable about a supporting shaft 117A by a cylinder device 117B. By making the arm 117C rotate in this way and positioning the arm in a predetermined position, a predetermined tension is given to the squeezing belt 115.

Another one of a plurality of rolls 116 has at least one end attached to a bracket 118B of a squeezing belt meandering correcting device 118 which moves forward and backward toward the traveling direction H of the squeezing belt 115 by the cylinder device 118A. Thus, when meandering occurs in traveling of the squeezing belt 115, this meandering is corrected by moving the bracket 118B forward or backward in the traveling direction H, and finely adjusting the inclination of the roll 116 in the traveling direction H. Here, in the filtering apparatus and the solid-liquid separating device of this embodiment, the rolls 102, 104, and 116, also including these rolls 116, other than drive roll 102A (separating roll 107) are used as driven rolls which are all not connected to a driving device.

A squeezing belt cleaning device 119 is provided at a traveling path of the squeezing belt 115, and a separating filter cloth cleaning device 120 is provided at a traveling path of the other separating filter cloth 108. A cleaning device (not shown) is also provided at a traveling path of one separating filter cloth 101, and a pan 121 is disposed at a bottom of the solid-liquid separating device. Moreover, a discharge port 122 which allows the cake of the material P, which has been separated into a solid and a liquid by the solid-liquid separating device, to be discharged is provided below the roll 102B, and a scraper 123, a wire, or the like is disposed at each of the pair of separating filter cloths 101 and 108 which are moved apart from each other in directions opposite toward the traveling direction F, G from the roll 102B so as to touch a surface which has been in contact with the material P. Additionally, on the outer side of the portion of the separating roll 107 around which the separating filter cloths 101 and 108 and the squeezing belt 115 are wound, a recovery plate 124 with an accurate cross-section is disposed at a distance from the squeezing belt 115 to recover a liquid component separated by ventilation to guide the liquid component to the pan 121.

In the second embodiment of such a solid-liquid separating device, the filtering apparatus including this solid-liquid separating device, and the solid-liquid separating method of the present invention using such a solid-liquid separating device, the material P filtered by the filtering device 104 of the filtering apparatus is sandwiched between the pair of separating filter cloths 101 and 108 at the outer circumference of the separating roll 107 of the solid-liquid separating device. Moreover, as the squeezing belt 115 is wound around the outer circumference of the filter cloth under high tension, the material receives a pressing force toward the radial inner side of the separating roll 107, and is squeezed. Accordingly, even when a drying step is at the subsequent stage of a solid-liquid separating step of the material P by the solid-liquid separating device, the load in this drying step can be reduced.

The pair of separating filter cloths 101 and 108 which sandwiches the material P therebetween and is wound around the separating roll 107 differ in the distance from the axis of the separating roll 107 by the thickness of the material P. Additionally, one separating filter cloth 101 is wound directly around the separating roll 107 (the drive roll 102A) and travels therealong, whereas the other separating filter cloth 108 and the squeezing belt 115 are made to travel via the one separating filter cloth 101 and the material P. Consequently, a circumferential speed difference is caused between the pair of separating filter cloths 101 and 108 at the outer circumference of the separating roll 107, and a shearing force which is going to shear the material P in the circumferential direction acts on the material P due to this circumferential speed difference, and the material P is efficiently squeezed by the shearing force and the pressing force.

In the separating roll 107, the ventilation gas A is ejected through the through holes 109 via the ventilation chambers 110 from the ventilation pipe 111 in predetermined rotational positions of the area where the pair of separating filter cloths 101 and 108 are wound as described above, and is ventilated toward the radial outer side of the separating roll 107 through the separating filter cloth 101, the material P, the separating filter cloth 108, and the squeezing belt 115. Accordingly, since a liquid component squeezed from the material P along with the ventilation gas A is separated from the material P via the separating filter cloth 108 and the squeezing belt 115, is dropped and recovered to the recovery plate 124, the liquid content of the material P in which sufficient solid liquid separation is conventionally difficult can also be sufficiently reduced.

Even if the ventilation gas A is ejected in this way to separate a liquid component from the material P, the squeezing belt 115 is wound around at an outer circumference of the other outer separating filter cloth 108 wound around the separating roll 107, thereby pressing the material P against the separating filter cloth 108. Therefore, even if the pressure of the ventilation gas A is raised, for example, in order to enhance liquid removal capability, it is possible to prevent the separating filter cloths 101 and 108 from floating, causing dispersion of a pressure fluid (ventilation gas A), or it is possible to prevent the cake from being blown off from both ends of the separating filter cloths 101 and 108 in the width direction or from the front or rear thereof in the traveling directions F and G. Accordingly, the ventilation gas A can reliably remove a liquid component, thereby further improving a liquid removal effect.

Particularly in the solid-liquid filtering apparatus of this embodiment, the plurality of ventilation chambers 110 is isolated from each other in a circumferential direction and formed at almost equal intervals inside the separating roll 107, and the ventilation pipe 111 which is connected to the ventilation chambers 110 to supply the ventilation gas A is provided with the automatic valve 113. Thus, the ventilation gas A is continuously supplied to only the ventilation chambers 110 in predetermined rotational positions among the ventilation chambers 110 within an area where the separating filter cloths 101 and 108 are wound.

Consequently, ventilation is performed in the portion which is not involved in the liquid removal of the material P so that the amount of supply of the ventilation gas A, the power for supply thereof, and the running cost can be prevented from increasing, the floating of the separating filter cloths 101 and 108 before and behind the separating filter cloths 101 and 108 in the traveling directions F and G and the blow-off of the cake can be prevented more reliably. On the other hand, in the portion which is involved in the liquid removal, a state where the ventilation gas A is always ejected irrespective of the rotational position of the ventilation chambers 110 can be maintained while switching open and close of the automatic valve 113 according to the rotation of the separating roll 107. Therefore, it is possible to promote more efficient removal of a liquid component.

As such, in order to more reliably prevent the floating of the separating filter cloths 101 and 108 or the blow-off of the cake, which is caused by the ventilation gas A, it is desirable to apply the expression pressure of the squeezing belt 115 wound around the separating roll 107 larger than the pressure (ventilation gas pressure) of the ventilation gas A which is ventilated in the radial direction of the separating roll 107. For example, when the ventilation gas pressure is 0.4 MPa, the expression pressure of the squeezing belt 115 is desirably set to about 0.5 MPa. Also, in the solid-liquid separating device of such a configuration, this expression pressure can also be controlled to a predetermined magnitude by adjusting the tension of the squeezing belt 115 by the above-mentioned squeezing belt tensioning device 117.

In this embodiment, the air permeability of this squeezing belt 115 is made higher than the air permeability of the separating filter cloths 101 and 108, and a liquid component separated from the material P by ventilation can be discharged rapidly, and can be recovered to the pan 121 from the recovery plate 124.

Meanwhile, in the filtering apparatus of this embodiment in which such a solid-liquid separating device is mounted ahead of the filtering device 104 in the traveling direction F of the filter cloth 101, the filter cloth 101 is used as one of the pair of separating filter cloths 101 and 108 in the solid-liquid separating device, and the separating roll 107 is used as one of the plurality rolls 102 of the filtering apparatus. Consequently, the material P on the filter cloth 101 filtered by the filtering device 104 can be supplied to the solid-liquid separating device continuously by the traveling of the filter cloth 101, and can be efficiently dehydrated as described above.

Accordingly, it is not necessary that the material P filtered by the filtering device 104 of the filtering apparatus is recovered from the filtering apparatus at once, and that it is dehydrated by a secondary dehydrator, such as a centrifuge or a filter press, which is provided separately from the filtering apparatus. Additionally, since the solid-liquid separating device can also be applied to, for example, a filtering apparatus, such as an established horizontal vacuum filtering apparatus, to such a degree that some modification is made thereto, it is economical. Additionally, even when the liquid component in the material P has been separated in a drying device at a subsequent stage, the burden in this drying device can be eased. Additionally, even when a product is conveyed to such a drying device at the subsequent stage, it is possible to solve troubles caused by the material P with a large liquid component adhering to a conveyor, such as a belt conveyor or a screw conveyor.

In the solid-liquid separating device and the solid-liquid separating method of the present invention, as described above, dehydration of the material P is performed at the outer circumference of the separating roll 107 which rotates with the traveling of the filter cloth 101. Therefore, even in a case where the traveling of the filter cloth 101 in the filtering apparatus is continuous or intermittent, efficient dehydration can be achieved by the pressing force and the shearing force, and further by the ventilation. Accordingly, the solid-liquid separating device and the solid-liquid separating method can also be correspondingly applied to, for example, a horizontal vacuum filtering apparatus in which the filter cloth 101 is clamped, and intermittently moved and made to travel in the traveling direction F at a predetermined stroke as well as the case where the separating roll 107 is continuously or intermittently rotated to make the filter cloth 101 to travel.

Moreover, in the solid-liquid separating device of this embodiment, the squeezing belt 115 is wound around and pressed against the outer circumference of the pair of separating filter cloths 101 and 108 wound around the separating roll 107, so that the filter cloth 101 can be strongly stuck on the outer circumference of the separating roll 107, thereby generating a large frictional force. Consequently, even if this frictional force decreases by ventilation, the separating roll 107 can be integrally rotated in the rotational direction T and the filter cloth 101 can be made to travel in the traveling direction F stably, without causing any slip between the separating roll 107 and the separating filter cloth 101.

Accordingly, in the filtering apparatus including such a solid-liquid separating device, like this embodiment, the separating roll 107 can be used as the drive roll 102A of the filter cloth 101 in this filtering apparatus, and one of the pair of separating filter cloths 101 and 108 is used in common with the filter cloth 101 of the filtering apparatus, so that facility cost or running cost can be reduced. Particularly, such a drive roll 102A requires a certain diameter in order to make the filter cloth 101 travel reliably, and the separating roll 107 also requires a certain diameter in order for the ventilation chambers 110 to be formed therein. Thus, these rolls are used commonly, so that the other rolls 102, 114, and 116 can be made to have a small diameter than the drive roll 102A and the separating roll 107, which is more economical.

INDUSTRIAL APPLICABILITY

The solid-liquid separating device and the solid-liquid separating method of the present invention can be used as a secondary dehydration mechanism of a filtering apparatus to sufficiently reduce the liquid content of a material and perform continuous solid liquid separation.

The invention claimed is:

1. A solid-liquid separating method comprising steps of:
traveling a pair of separating filter cloths which is endless belts wound around a separating roll having a substantially cylindrical shape with a plurality of through holes, which penetrate between an inner surface and an outer surface in radial direction thereof, and is rotatable in a circumferential direction thereof so as to overlap each other along a rotational direction of the separating roll;
squeezing a material, which has been supplied between the pair of separating filter cloths, between the pair of separating filter cloths on the outer circumference of the separating roll; and
dehydrating by ejecting a ventilation gas from the outer circumference of the separating roll via each through hole, the ventilation gas being supplied to an inside of the separating roll.

2. The solid-liquid separating method according to claim 1, wherein a squeezing belt which is wound around an outer circumference of an outside separating filter cloth of the pair of separating filter cloths wound around the outer circumference of the separating roll travels along the rotational direction of the separating roll together with the pair of separating filter cloths, and the material is squeezed by the pair of separating filter cloths and the squeezing belt.

3. The solid-liquid separating method according to claim 2, wherein expression pressure of the squeezing belt wound around the outer circumference of the outside separating filter cloth of the pair of separating filter cloths wound around the outer circumference of the separating roll is greater than the pressure of ventilation gas which is ventilated via the through holes.

* * * * *